(12) United States Patent
Ootaki

(10) Patent No.: US 12,057,929 B2
(45) Date of Patent: Aug. 6, 2024

(54) OPTICAL TRANSMISSION DEVICE AND OPTICAL COMMUNICATION SYSTEM

(71) Applicant: NEC Corporation, Tokyo (JP)

(72) Inventor: Kazuhiro Ootaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/766,323

(22) PCT Filed: Sep. 14, 2020

(86) PCT No.: PCT/JP2020/034645
§ 371 (c)(1),
(2) Date: Apr. 4, 2022

(87) PCT Pub. No.: WO2021/070565
PCT Pub. Date: Apr. 15, 2021

(65) Prior Publication Data
US 2024/0056212 A1    Feb. 15, 2024

(30) Foreign Application Priority Data

Oct. 9, 2019  (JP) ................................ 2019-186378

(51) Int. Cl.
| | | |
|---|---|---|
| *H04B 10/077* | (2013.01) | |
| *H04B 10/27* | (2013.01) | |
| *H04B 10/80* | (2013.01) | |
| *H04J 14/02* | (2006.01) | |

(52) U.S. Cl.
CPC .......... *H04J 14/0307* (2023.08); *H04B 10/27* (2013.01); *H04B 10/80* (2013.01); *H04J 14/022* (2013.01); *H04J 14/02212* (2023.08)

(58) Field of Classification Search
CPC .................................................... H04B 10/077
See application file for complete search history.

(56) References Cited

U.S. PATENT DOCUMENTS

| | | | |
|---|---|---|---|
| 2004/0213569 A1 | 10/2004 | Taga et al. | |
| 2008/0126596 A1* | 5/2008 | Yuan ................... | G06F 13/4081 710/19 |
| 2015/0256282 A1 | 9/2015 | Manna | |

(Continued)

FOREIGN PATENT DOCUMENTS

| | | |
|---|---|---|
| JP | 2003-224542 A | 8/2003 |
| JP | 2015-501088 A | 1/2015 |

(Continued)

OTHER PUBLICATIONS

International Search Report for PCT Application No. PCT/JP2020/034645, mailed on Dec. 8, 2020.

*Primary Examiner* — Shi K Li

(57) ABSTRACT

An optical transmission device and an optical communication system being capable of coping with various installation forms of a transponder in a unit of optical fiber transmission path are provided. The optical transmission device is installed inside a station building. First and second interface units are connected to first and second fiber transmission paths accommodated in a submarine optical fiber cable. A first fiber transmission path mediates an optical signal to be transmitted between the first interface unit and a first transponder. A second fiber transmission path mediates an optical signal to be transmitted between the second interface unit and a second transponder.

8 Claims, 9 Drawing Sheets

(56) References Cited

U.S. PATENT DOCUMENTS

| | | | | |
|---|---|---|---|---|
| 2015/0381276 A1* | 12/2015 | Saito | ................. | H04B 10/0799 |
| | | | | 398/34 |
| 2016/0226617 A1 | 8/2016 | Muth et al. | | |
| 2019/0190231 A1* | 6/2019 | Winzer | ................. | H01S 3/2316 |
| 2020/0067887 A1* | 2/2020 | Sarwar | ..................... | H04L 9/16 |
| 2021/0194616 A1* | 6/2021 | Yamamoto | .............. | H04J 14/02 |

FOREIGN PATENT DOCUMENTS

| | | | | |
|---|---|---|---|---|
| JP | 2016-523025 A | 8/2016 | | |
| JP | 2018-133707 A | 8/2018 | | |
| WO | WO-2017168994 A1 * | 10/2017 | ........... | H04B 10/032 |

* cited by examiner

OPTICAL TRANSMISSION DEVICE AND OPTICAL COMMUNICATION SYSTEM

This application is a National Stage Entry of PCT/JP2020/034645 filed on Sep. 14, 2020, which claims priority from Japanese Patent Application 2019-186378 filed on Oct. 9, 2019, the contents of all of which are incorporated herein by reference, in their entirety.

TECHNICAL FIELD

The present invention relates to an optical transmission device and an optical communication system.

BACKGROUND ART

An optical communication system that transmits an optical signal through an optical fiber accommodated in an optical fiber cable has become widespread. In such an optical communication system, a station building provided with an optical transmission device for transmitting and receiving an optical signal is connected by an optical fiber cable. The station building is generally provided with a plurality of transponders, and each transponder transmits and receives an optical signal to and from another party through the optical transmission device. In this case, optical signals being output from a plurality of transponders are multiplexed, and then transmitted as a wavelength multiplexed signal, for example (Patent Literatures 1 and 2).

A submarine optical communication system in which station buildings are connected by a submarine optical fiber cable laid on the bottom of the sea employs the same configuration as described above (Patent Literature 3). Specifically, a plurality of transponders are accommodated in a station building of a land station, and a wavelength multiplexed signal acquired by multiplexing optical signals being output from the transponders is transmitted by a submarine optical fiber cable.

CITATION LIST

Patent Literature

[Patent Literature 1] Japanese Unexamined Patent Application Publication No. 2018-133707
[Patent Literature 2] Published Japanese Translation of PCT International Publication for Patent Application, No. 2015-501088
[Patent Literature 3] Japanese Unexamined Patent Application Publication No. 2003-224542

SUMMARY OF INVENTION

Technical Problem

However, in recent years, the number of optical fibers accommodated in a submarine optical fiber cable has increased, i.e., multi-core formation of a submarine optical fiber cable has progressed. The accommodated optical fibers may also be assigned to a different user.

According to diversification of users, an installation form of a transponder is also diversified. For example, it is required to install a transponder in a data center or a point of presence (POP) station outside a station building rather than accommodating the transponder in the station building as described above. Therefore, in response to such a request from a user, it is required to cope with different installation forms of a transponder in a unit of optical fiber transmission path.

The present invention has been made in view of the above circumstances, and an object thereof is to provide an optical transmission device and an optical communication system that can cope with various installation forms of a transponder in a unit of optical fiber transmission path.

Solution to Problem

An optical transmission device according to one aspect of the present invention is installed inside a station building, and includes a plurality of interface units configured to include first and second interface units being connected to mutually different first optical fiber transmission paths accommodated in an optical fiber cable, a second optical fiber transmission path configured to mediate an optical signal to be transmitted between the first interface unit and a first transponder installed inside the station building, and a third optical fiber transmission path configured to mediate an optical signal to be transmitted between the second interface unit and a second transponder installed outside the station building.

An optical communication system according to one aspect of the present invention includes an optical transmission device installed inside a station building, a first transponder installed inside the station building, and a second transponder installed outside the station building, and the optical transmission device includes a plurality of interface units configured to include first and second interface units being connected to mutually different first optical fiber transmission paths accommodated in an optical fiber cable, a second optical fiber transmission path configured to mediate an optical signal to be transmitted between the first interface unit and the first transponder, and a third optical fiber transmission path configured to mediate an optical signal to be transmitted between the second interface unit and the second transponder.

Advantageous Effects of Invention

According to the present invention, it is possible to provide an optical transmission device and an optical communication system that can cope with various installation forms of a transponder in a unit of optical fiber transmission path.

DESCRIPTION OF EMBODIMENTS

Figure 1:
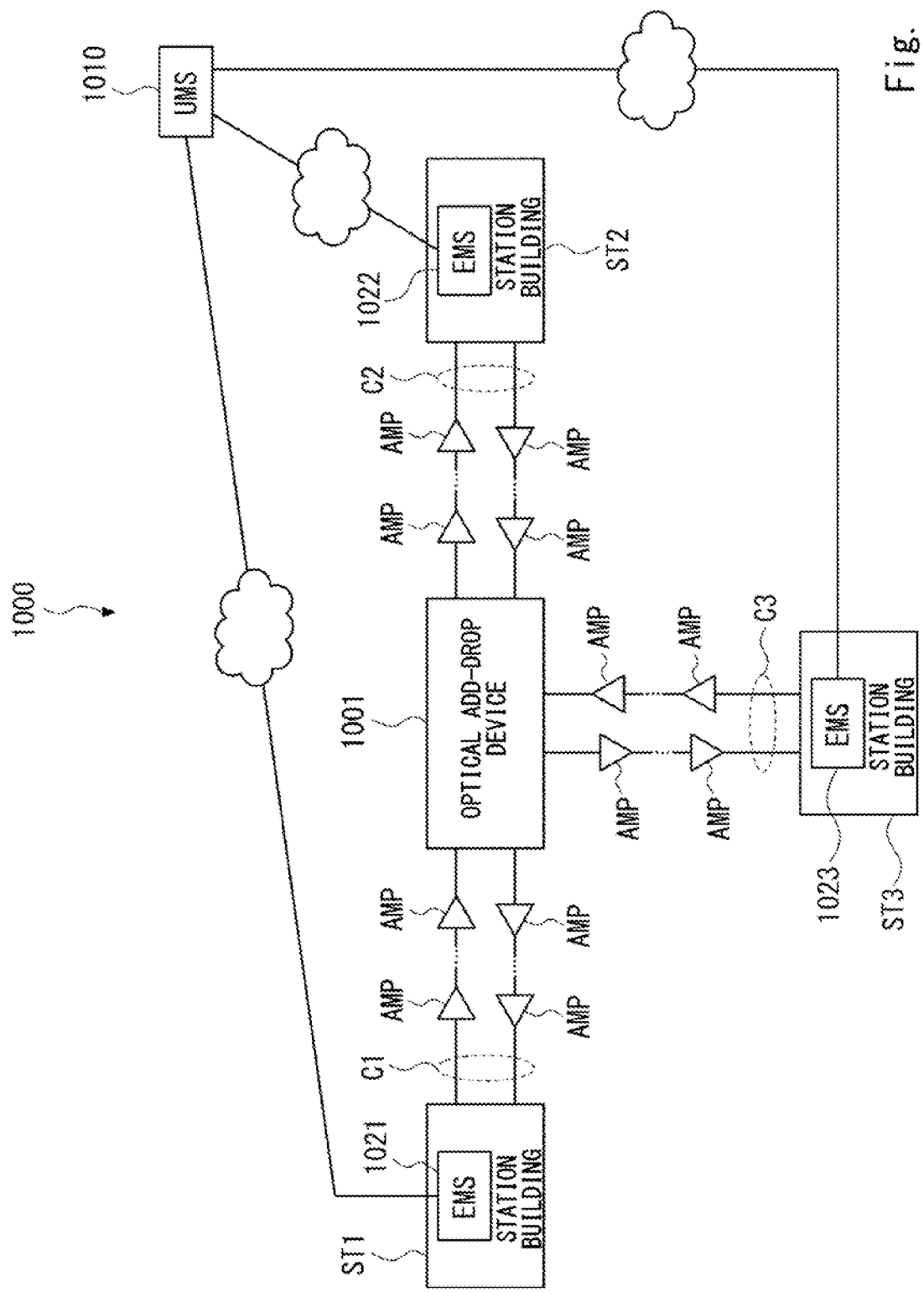
FIG. 1 is a diagram schematically illustrating a configuration example of an optical communication system according to a first example embodiment.

Hereinafter, example embodiments of the present invention will be described with reference to the drawings. In the drawings, the same elements are denoted by the same reference signs, and a repetitive description thereof is omitted as necessary.

First Example Embodiment

Hereinafter, an example embodiment of the present invention will be described with reference to the drawings. An optical transmission device according to a first example embodiment is installed in a station building included in an optical communication system 1000 configured as a submarine optical network system, for example.

FIG. 1 schematically illustrates a configuration example of the optical communication system 1000 according to the first example embodiment. In this example, the optical communication system 1000 is configured to connect three station buildings with one another. Specifically, the optical communication system 1000 includes station buildings ST1 to ST3, an optical relay amplifier AMP, optical fiber cables C1 to C3, an optical add-drop device 1001, and a unified management system (UMS) 1010.

Each of the station buildings ST1 to ST3 is provided with element management systems (EMS) 1021 to 1023 for monitoring a state in the station building. The UMS 1010 communicates with the EMSs 1021 to 1023 via a cloud network, and thereby can recognize states of the station buildings ST1 to ST3 and control an operations of the station buildings ST1 to ST3.

A transmission path for transmitting an optical signal between the station building ST1 and the station building ST2 is referred to as a main transmission path. In the main transmission path, between the station building ST1 and the optical add-drop device 1001 are connected by the optical fiber cable C1, and between the station building ST2 and the optical add-drop device 1001 are connected by the optical fiber cable C2. In order to amplify an optical signal being attenuated by the transmission, one or more optical relay amplifiers AMP are provided in the optical fiber cables C1 and C2. Although one optical add-drop device 1001 is illustrated herein for simplification of description, it is needless to say that the number of optical add-drop devices 1001 is not limited to one.

A transmission path for transmitting an optical signal between the station building ST3 and the optical add-drop device 1001 is referred to as a drop transmission path. In the drop transmission path, between the optical add-drop device 1001 and the station building ST3 is connected by the optical fiber cable C3. In order to amplify an optical signal being attenuated by the transmission, one or more optical relay amplifiers AMP are also provided in the optical fiber cable C3.

Each of the station buildings ST1 to ST3 is provided with an optical transmission device for transmitting and receiving an optical signal via the optical fiber cables C1 to C3. Hereinafter, the optical transmission device will be described.

Figure 2:
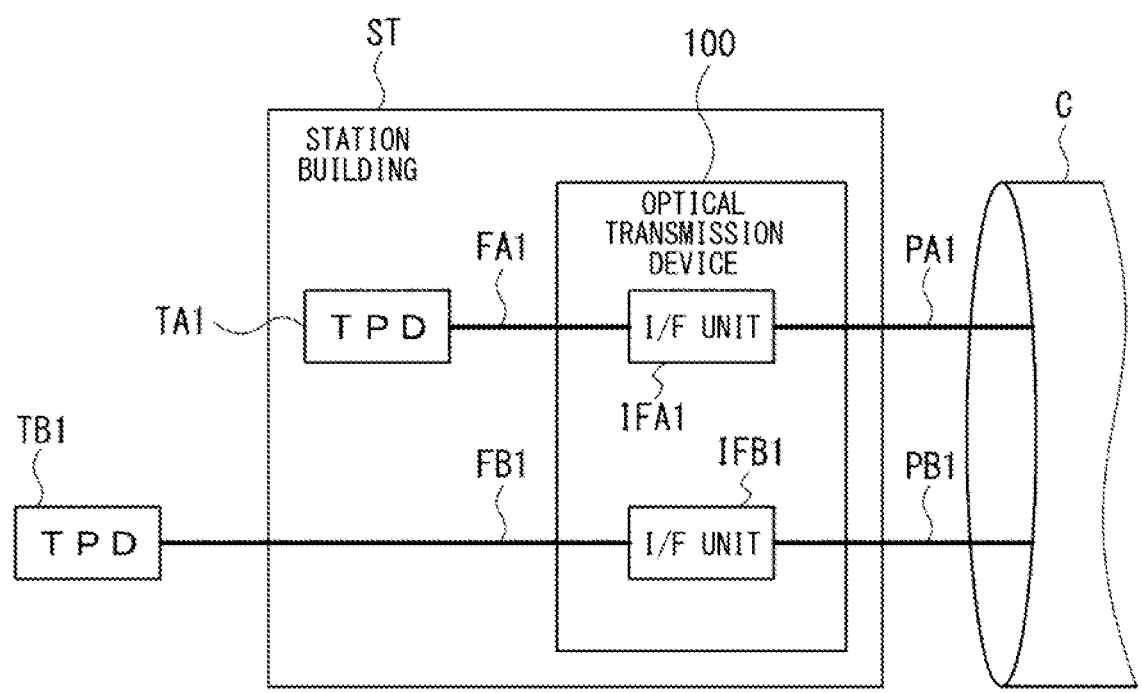
FIG. 2 is a diagram schematically illustrating a configuration of an optical transmission device according to the first example embodiment.

FIG. 2 schematically illustrates a configuration of an optical transmission device 100 according to the first example embodiment. The optical transmission device 100 is configured as a device accommodated in a station building ST. For example, the station building ST is provided as a landing station of a submarine optical fiber cable, and the optical transmission device 100 is connected to the submarine optical fiber cable. Note that, the station building ST is associated with each of the station buildings ST1 to ST3 described above. Further, the EMS described above may be provided in the optical transmission device, or may be provided separately from the optical transmission device in the station building.

The optical transmission device 100 is configured to connect one or more in-station transponders (TPD in the figure) provided inside the station building ST and one or more out-of-station transponders provided outside the station building ST to a submarine optical fiber cable C via an interface unit.

In other words, a plurality of transponders are connected to the optical transmission device 100. Some or all of the plurality of transponders may be assigned to a plurality of users different from each other. In addition, a priority for performing communication may be set for some or all of the plurality of transponders.

Each transponder is manufactured by various vendors, and any transponder configured according to various standards can be applied. In response to this, the optical transmission device 100 may be configured as an open cable interface (OCI).

Note that, the transponder is configured as an optical transceiver for transmitting and receiving an optical signal. Therefore, each of optical transmission paths illustrated by one solid line in FIG. 2 is actually an optical fiber pair configured by a transmission (upstream) optical fiber and a reception (downstream) optical fiber. Note that, in the following description, an optical fiber pair is also simply referred to as an optical fiber transmission path.

Figure 3:
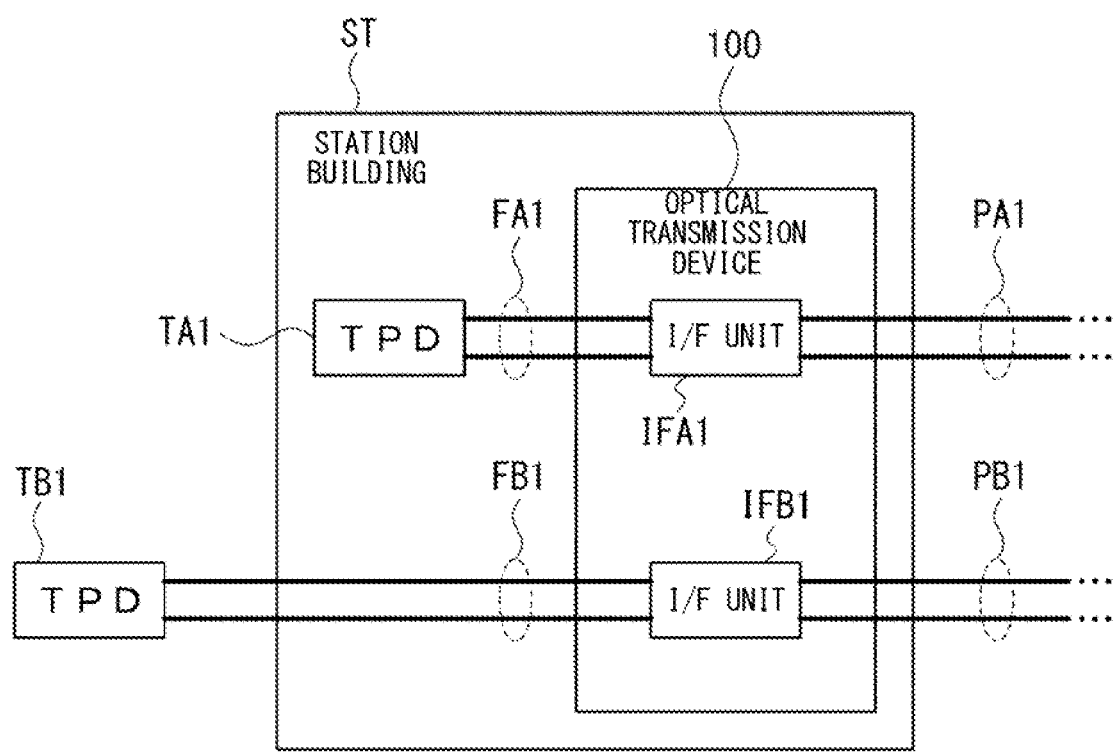
FIG. 3 is a diagram illustrating a configuration of the optical transmission device according to the first example embodiment in more detail.

FIG. 3 illustrates a configuration of the optical transmission device 100 according to the first example embodiment in more detail. As illustrated in FIGS. 2 and 3, optical fiber pairs FA1, FB1, PA1, and PB1 configured by two optical fibers are provided as optical fiber transmission paths.

FIGS. 2 and 3 illustrates an example in which one in-station transponder TA1 is provided inside the station building ST, and one out-of-station transponder TB1 is provided outside the station building ST. The optical transmission device 100 includes an interface unit IFA1 for an in-station transponder and an interface unit IFB1 for an out-of-station transponder. Hereinafter, the in-station transponder is also referred to as a first transponder, and the out-of-station transponder is also referred to as a second transponder. The interface unit IFA1 is also referred to as a first interface unit, and the interface unit IFB1 is also referred to as a second interface unit.

The in-station transponder TA1 is connected to the optical fiber pair PA1 accommodated in the submarine optical fiber cable C via the interface unit IFA1 for the in-station transponder. The in-station transponder TA1 and the interface unit IFA1 for the in-station transponder are connected by the optical fiber pair FA1 with each other. Hereinafter, an optical fiber pair accommodated in the submarine optical fiber cable C is also referred to as a first optical fiber transmission path. An optical fiber pair connecting the in-station transponder and the interface unit for the in-station transponder is also referred to as a second optical fiber transmission path.

The out-of-station transponder TB1 is connected to the optical fiber pair PB1 accommodated in the submarine optical fiber cable C via the interface unit IFB1 for the out-of-station transponder. The out-of-station transponder TB1 and the interface unit IFB1 for the out-of-station transponder are connected by the optical fiber pair FB1. Hereinafter, an optical fiber pair connecting the out-of-station transponder and the interface unit for the out-of-station transponder is also referred to as a third optical fiber transmission path.

Note that, in the above description, an example that one in-station transponder and one out-of-station transponder are connected to the optical transmission device 100, but this is merely an example. In other words, a plurality of in-station transponders and a plurality of out-of-station transponders may be connected to the optical transmission device.

Figure 4:
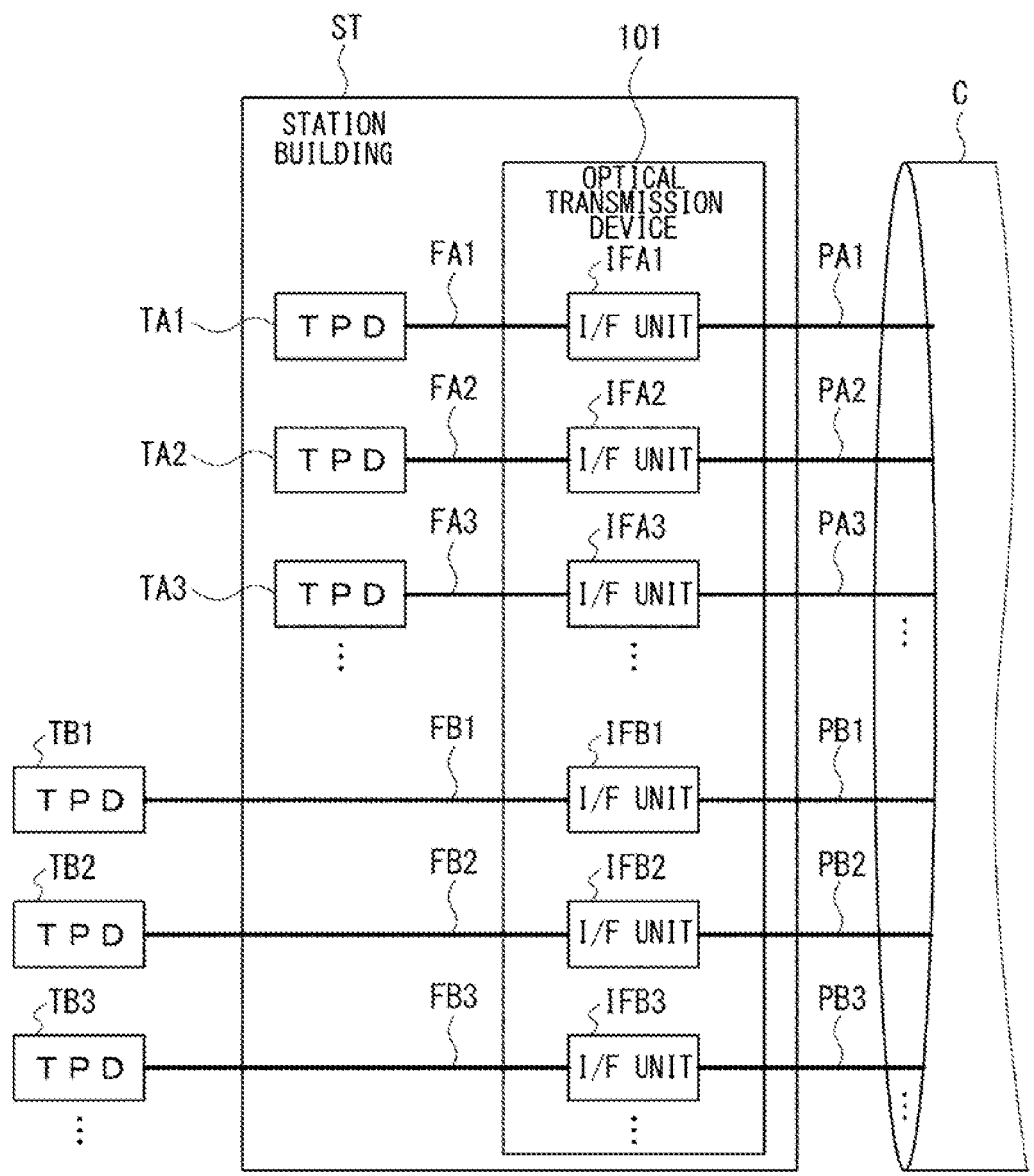
FIG. 4 is a diagram illustrating the optical transmission device in which a plurality of in-station transponders and a plurality of out-of-station transponders are connected to one another.

FIG. 4 illustrates an optical transmission device 101 in which a plurality of in-station transponders and a plurality of out-of-station transponders are connected. In the optical transmission device 101, a plurality of in-station transponders TA1, TA2, TA3, . . . and a plurality of out-of-station transponders TB1, TB2, TB3, . . . are connected. In response to this, in the optical transmission device 101, interface units IFA1, IFA2, IFA3, . . . for a plurality of in-station transponders and interface units IFB1, IFB2, IFB3, . . . for a plurality of out-of-station transponders are provided.

The in-station transponders TA1, TA2, TA3, . . . are connected to optical fiber pairs PA1, PA2, PA3, . . . respectively accommodated in the submarine optical fiber cable C via optical fiber pairs FA1, FA2, FA3, . . . and the interface units IFA1, IFA2, IFA3, . . . for the in-station transponder.

The out-of-station transponders TB1, TB2, TB3, . . . are connected to optical fiber pairs PB1, PB2, PB3, . . . respectively accommodated in the submarine optical fiber cable C via optical fiber pair FB1, FB2, FB3, . . . and the interface units IFB1, IFB2, IFB3, . . . for the out-of-station transponder.

As described with reference to FIG. 4, the optical transmission device according to the present example embodiment can have a configuration associated with any number of in-station transponders and out-of-station transponders.

As described above, according to the present configuration, it is possible to provide an interface unit for connecting a submarine cable to both an in-station transponder provided inside a station building where an optical transmission device is installed and an out-of-station transponder provided outside the station building. Thus, a degree of freedom of an installation location of the transponder can be improved. As a result, it is possible to provide an optical transmission device and an optical communication system that can cope with various installation forms of a transponder in a unit of optical fiber transmission path.

Further, each of the above-described interface units can be configured as a flat box type device. Thus, a plurality of interface units may be configured to be accommodated in a rack. In this case, by accommodating a plurality of interface units in the rack, downsizing of the optical transmission device can be achieved and space saving can be achieved.

Second Example Embodiment

An optical transmission device according to a second example embodiment will be described. The optical transmission device according to the second example embodiment is a modification example of the optical transmission device according to the first example embodiment, and has a configuration in which either one or both of an in-station transponder and an out-of-station transponder are provided with a plural number.

Figure 5:
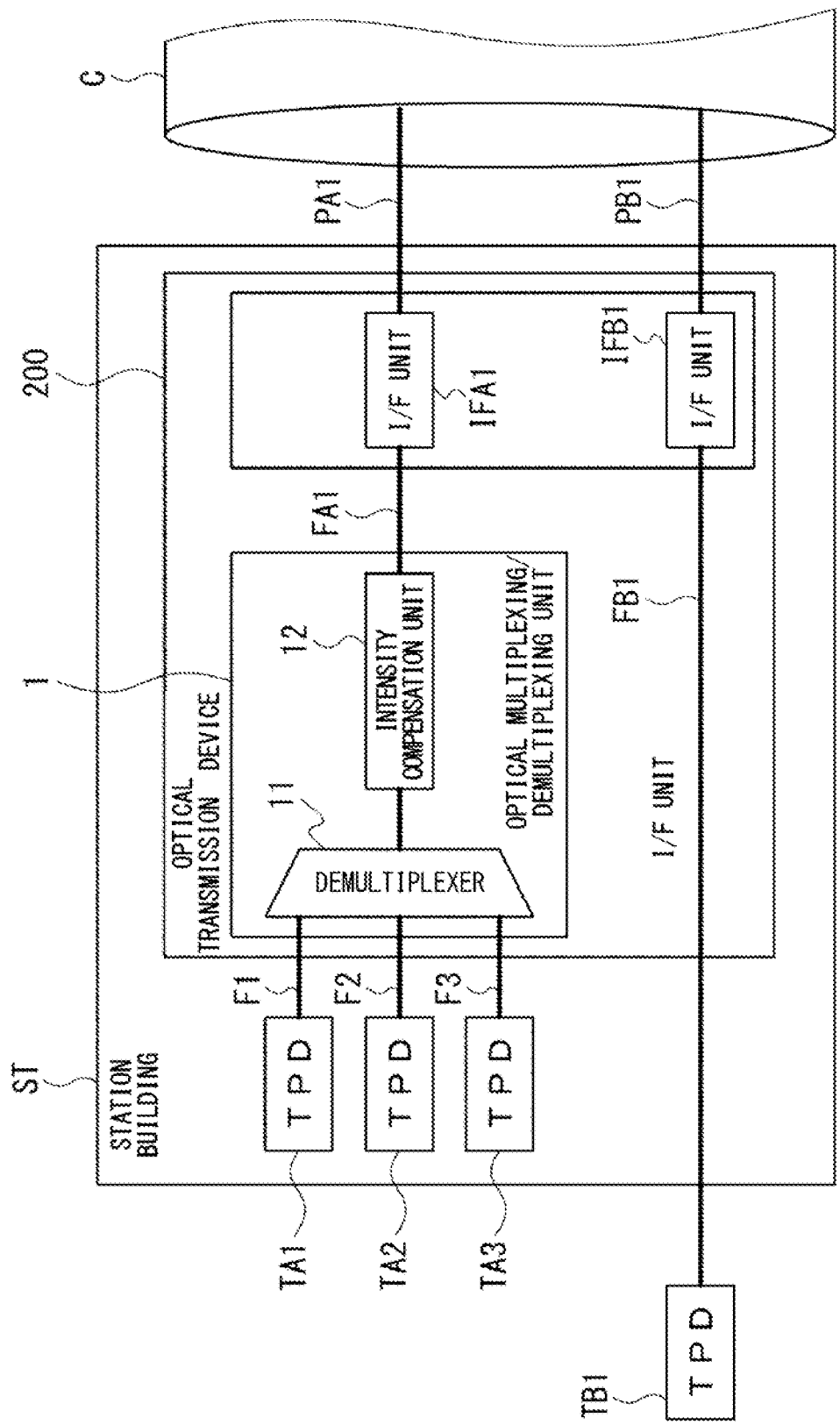
FIG. 5 is a diagram schematically illustrating a configuration of an optical transmission device according to a second example embodiment.

FIG. 5 schematically illustrates a configuration of an optical transmission device 200 according to the second example embodiment. In the optical transmission device 200 in FIG. 5, a plurality of in-station transponders, specifically three (TA1 to TA3), are provided. An optical multiplexing/demultiplexing unit 1 is inserted between the in-station transponders TA1 to TA3 and an optical fiber pair FA1.

The optical multiplexing/demultiplexing unit 1 includes a multiplexer/demultiplexer 11 and an intensity compensation unit 12. Hereinafter, the optical multiplexing/demultiplexing unit 1 is also referred to as a first optical multiplexing/demultiplexing unit.

The multiplexer/demultiplexer 11 is optically connected to the in-station transponders TA1 to TA3 via optical fiber pairs F1 to F3. The multiplexer/demultiplexer 11 multiplexes optical signals being output from the in-station transponders TA1 to TA3, and outputs, for example, as a wavelength multiplexed optical signal, to the intensity compensation 12. Further, the multiplexer/demultiplexer 11 demultiplexes an optical signal being input from the optical fiber pair FA1, and distributes the demultiplexed optical signal to each of the in-station transponders TA1 to TA3.

The intensity compensation unit 12 compensates the multiplexed optical signal. As described with reference to FIG. 1, in an optical relay amplifier inserted into an optical fiber cable, an optical direct amplifying device (hereinafter, referred to as an optical amplifier) capable of amplifying power of an optical signal is generally used. Further, in a wavelength division multiplexing (WDM) communication system, it is important to secure a signal-to-noise ratio (hereinafter, referred to as an S/N ratio) of a signal wavelength. Therefore, the optical amplifier is controlled in such a way that a total sum of power of optical signals in a plurality of bands included in a wavelength-multiplexed optical signal is kept constant. On the other hand, in the optical amplifier, control of the power of the optical signal in each band is not performed. Therefore, in the WDM communication system, it is necessary to keep a total sum of the power of the wavelength-multiplexed optical signals constant while maintaining power balance of optical signals in a plurality of bands, by including dummy light having a wavelength different from a wavelength of signal light in the wavelength-multiplexed optical signals.

Therefore, in this configuration, the intensity compensation unit 12 compensates power balance of an optical signal of each channel by inserting dummy light into the multiplexed optical signal in response to presence or absence of the optical signal and optical intensity of each channel. The optical signal after compensating the optical intensity is output to the interface unit IFA1 via the optical fiber pair FA1.

Figure 6:
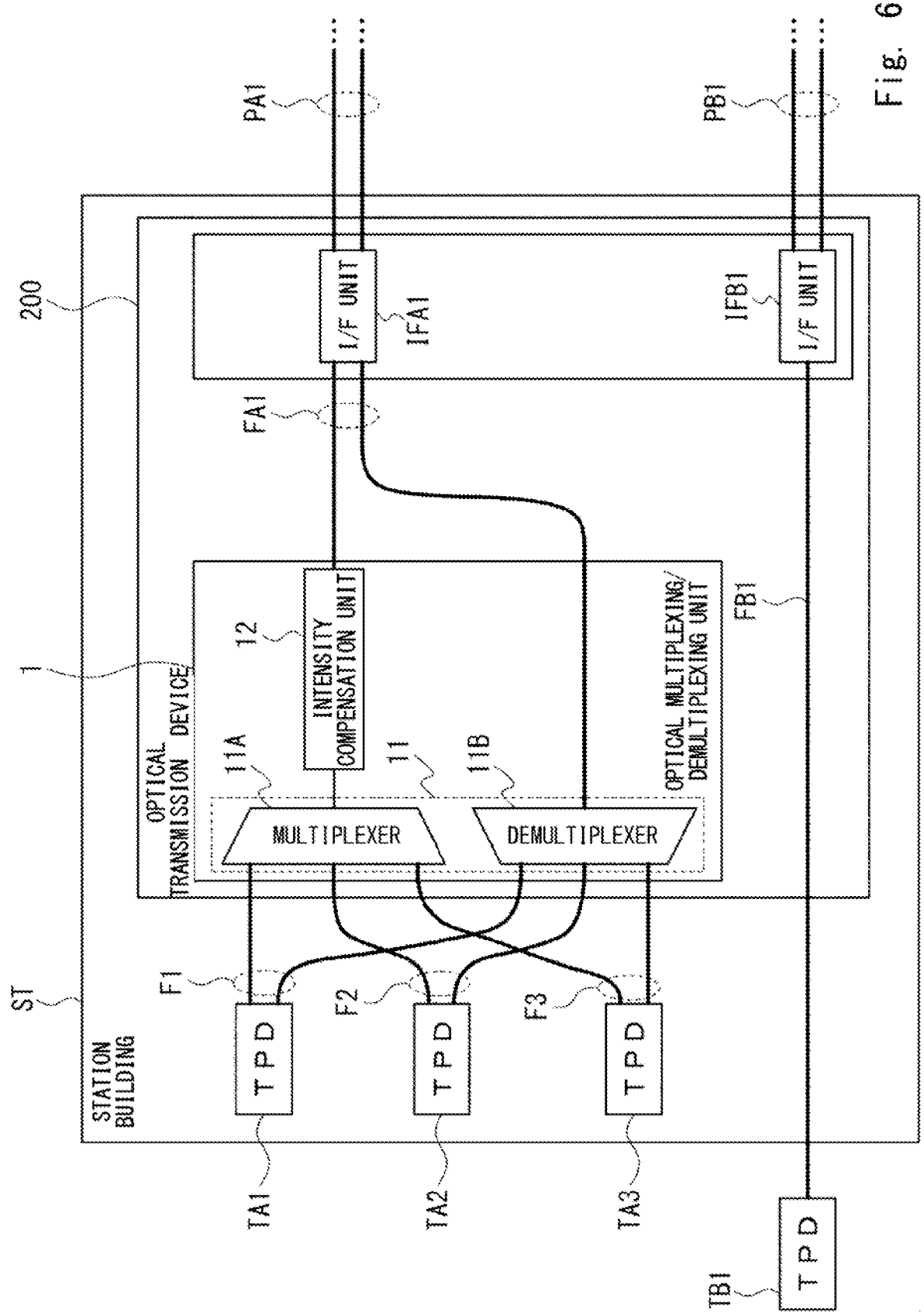
FIG. 6 is a diagram illustrating a configuration of the optical transmission device according to the second example embodiment in more detail.

A configuration example of the multiplexer/demultiplexer 11 will be described in more detail. FIG. 6 illustrates a configuration of the optical transmission device 200 according to the second example embodiment in more detail. As illustrated in FIG. 6, the multiplexer/demultiplexer 11 includes a multiplexer 11A and a demultiplexer 11B.

Inputs of the multiplexer 11A are optically connected to the in-station transponders TA1 to TA3 respectively via the optical fiber pairs F1 to F3 (i.e., transmission optical fibers of each of optical fiber pairs). An output of the multiplexer 11A is optically connected to the intensity compensation unit 12 via an optical fiber. The multiplexer 11A multiplexes optical signals being output from the in-station transponders TA1 to TA3 and outputs the multiplexed signals to the intensity compensation unit 12.

An input of the demultiplexer 11B is connected to a reception optical fiber of the optical fiber pair FA1, and outputs are optically connected to the in-station transponders TA1 to TA3 respectively via the optical fiber pairs F1 to F3 (i.e., reception optical fibers of each of optical fiber pairs). The demultiplexer 11B demultiplexes an optical signal being input via the optical fiber pair FA1, and distributes the demultiplexed optical signal to the in-station transponders TA1 to TA3.

In this configuration, it is possible to transmit a multiplexed optical signal in which optical signals being output from a plurality of in-station transponders are multiplexed, and demultiplex the multiplexed optical signal and distribute the demultiplexed optical signal to each of a plurality of in-station transponders. Thus, it is possible to improve transmission efficiency of each of the optical fiber pairs having a limited number accommodated in a submarine optical fiber cable C.

In the above description, although one optical multiplexing/demultiplexing unit for multiplexing and demultiplexing optical signals transmitted and received by a plurality of in-station transponders is provided, this is merely an example. For example, two or more optical multiplexing/demultiplexing units for multiplexing and demultiplexing optical signals transmitted and received by a plurality of in-station transponders may be provided, and each of the optical multiplexing/demultiplexing units may be connected to different optical fiber pairs accommodated in the submarine optical fiber cable C.

In addition, one or more optical multiplexing/demultiplexing units for multiplexing and demultiplexing optical signals transmitted and received by a plurality of out-of-station transponders may be provided. In this case, an optical multiplexing/demultiplexing unit that multiplexes and demultiplexes optical signals transmitted and received by a plurality of out-of-station transponders is also referred to as a second optical multiplexing/demultiplexing unit. Also in this case, two or more optical multiplexing/demultiplexing units may be provided, and each of the optical multiplexing/demultiplexing units may be connected to different optical fiber pairs accommodated in the submarine optical fiber cable C.

In a case where a plurality of out-of-station transponders are provided, optical multiplexing/demultiplexing may be performed by an optical multiplexing/demultiplexing unit provided outside a station building ST, for example, in a data center accommodating the plurality of out-of-station transponders, or the like. In this case, for example, a wavelength multiplexed signal is transmitted by an optical fiber pair connecting between the optical multiplexing/demultiplexing unit and an interface unit for the out-of-station transponder connected to the optical multiplexing/demultiplexing unit.

Note that, in the present example embodiment, the optical multiplexing/demultiplexing unit may be configured as a flat box type device, and a plurality of optical multiplexing/demultiplexing units may be configured to be accommodated in a rack. In this case, by accommodating the interface unit and the optical multiplexing/demultiplexing unit in the rack, downsizing of the optical transmission device can be achieved and space saving can be achieved.

Third Example Embodiment

An optical transmission device according to a third example embodiment will be described. The optical transmission device according to the third example embodiment is a modification example of the optical transmission device according to the second example embodiment, and a spare interface unit is provided in addition to an interface unit for an in-station transponder and an interface unit for an out-of-station transponder. Hereinafter, the spare interface unit is also referred to as a third interface unit.

Figure 7:
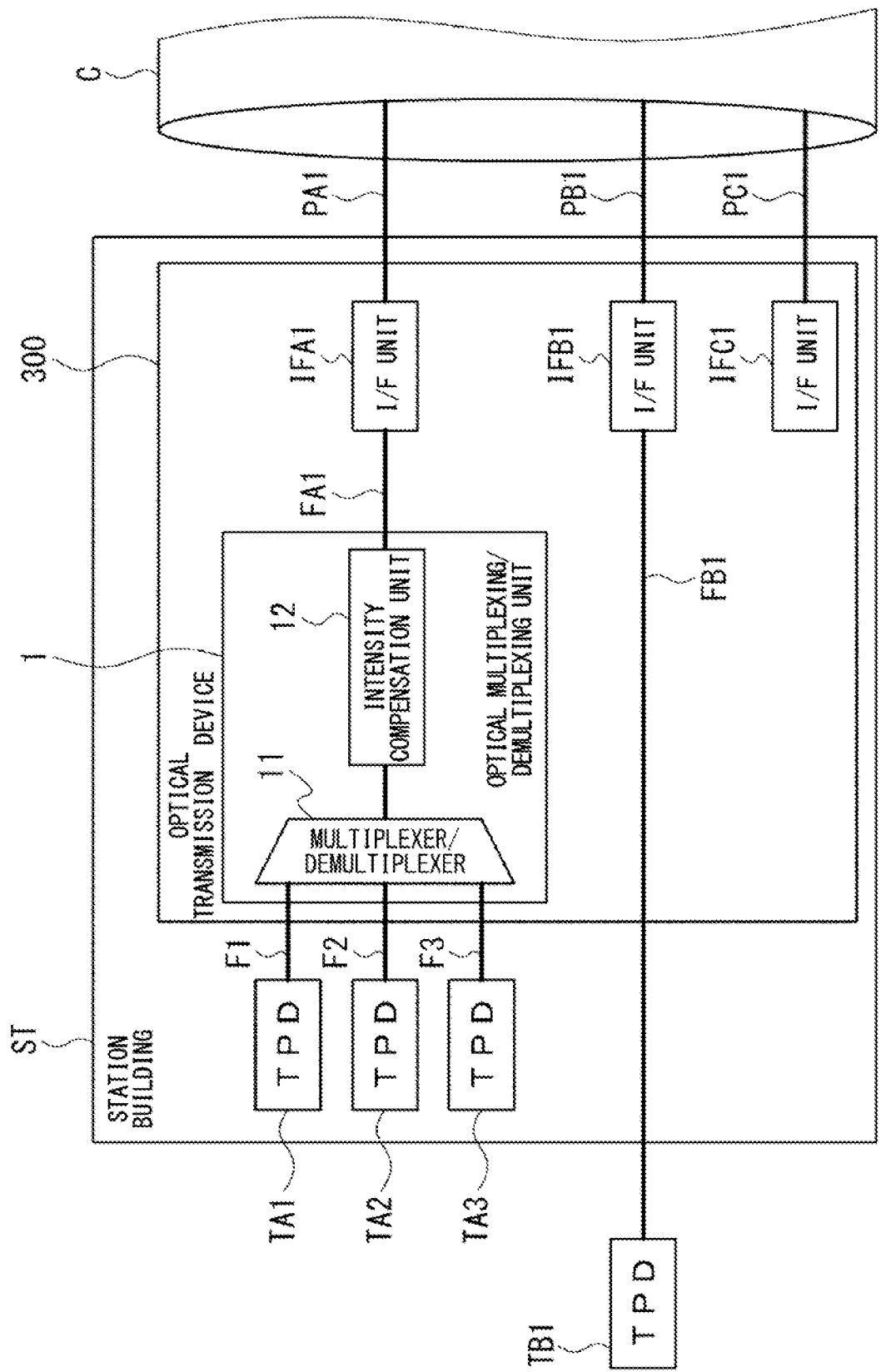
FIG. 7 is a diagram schematically illustrating a configuration of an optical transmission device according to a third example embodiment.

FIG. 7 schematically illustrates a configuration of an optical transmission device 300 according to the third example embodiment. The optical transmission device 300 has a configuration in which a spare interface unit IFC1 is added to the optical transmission device according to the second example embodiment.

One end of the spare interface unit IFC1 is connected to an optical fiber pair PC1 accommodated in a submarine optical fiber cable C, while the other end is in an open state.

The spare interface unit IFC1 is provided, for example, in order to cope with addition of a transponder in future, and can be connected to an in-station transponder or an out-of-station transponder as required. Depending on application, it may be conceived that the transponder is added after an optical network system is designed or after an operation is started, and therefore, according to the present configuration, it is possible to cope with such addition. In addition, it may be used as a backup when any of the interface unit for the in-station transponder and the interface unit for the out-of-station transponder being already used fails.

The spare interface unit IFC1 may be connected to a single in-station transponder, or may be connected to a plurality of in-station transponders via an optical multiplexing/demultiplexing unit. Further, the spare interface unit IFC1 may be connected to a single out-of-station transponder, or may be connected to a plurality of out-of-station transponders via an optical multiplexing/demultiplexing unit.

Note that, in this configuration, an example in which one spare interface unit is provided has been described, but this is merely an example. It is needless to say that two or more spare interface units may be provided in the optical transmission device as necessary.

As described above, according to the present configuration, it is possible to provide an optical transmission device that can easily cope with a configuration change such as addition of a transponder in future regardless of in-station or out-of-station.

Fourth Example Embodiment

An optical transmission device according to a fourth example embodiment will be described. The optical transmission device according to the fourth example embodiment is a modification example of the optical transmission device according to the third example embodiment, and is configured to be capable of outputting a control signal to equipment connected by a submarine optical fiber cable C.

Figure 8:
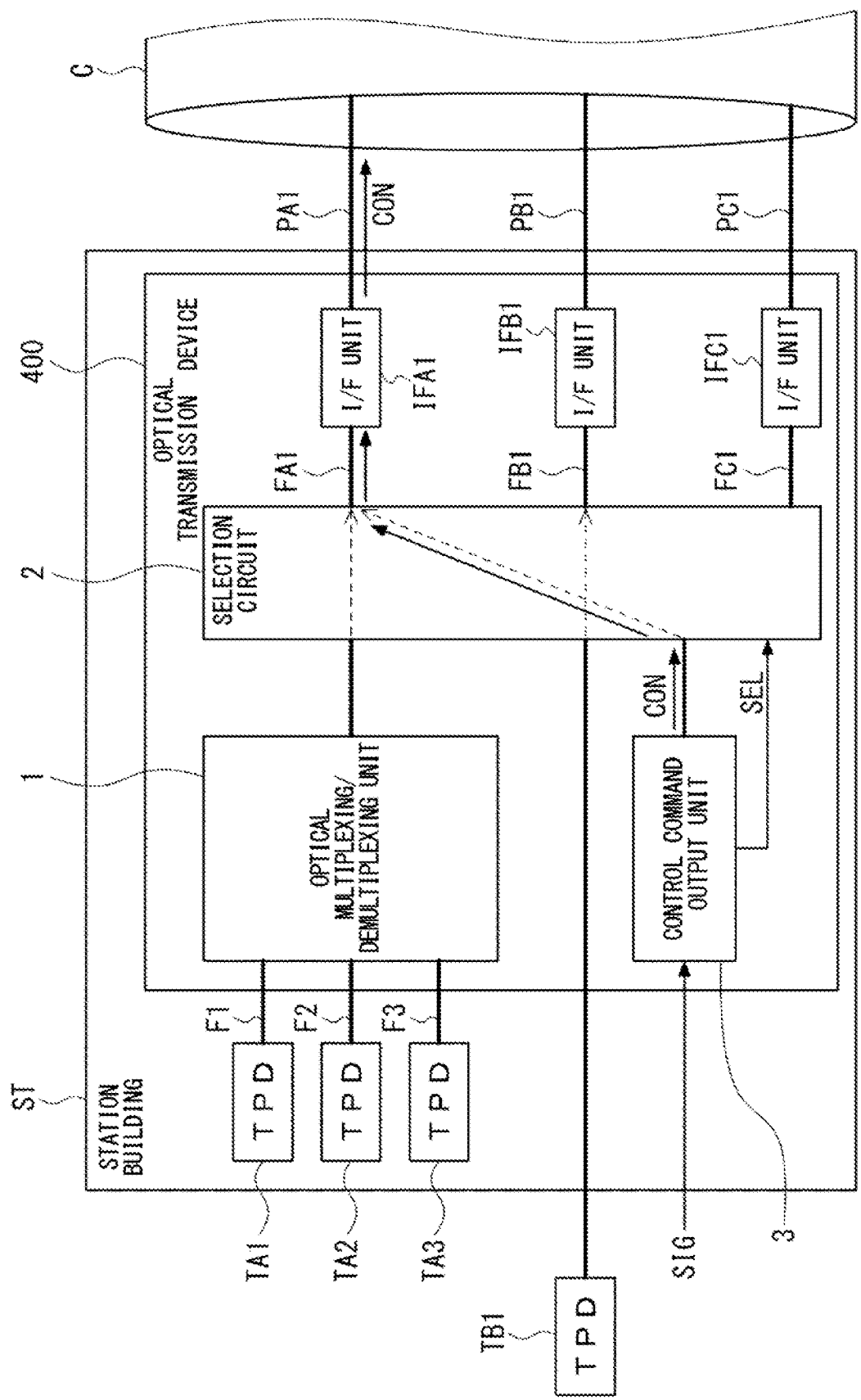
FIG. 8 is a diagram schematically illustrating a configuration of an optical transmission device according to a fourth example embodiment.

FIG. 8 schematically illustrates a configuration of an optical transmission device 400 according to the fourth example embodiment. The optical transmission device 400 has a configuration in which a selection circuit 2 and a control command output unit 3 are added to the optical transmission device according to the third example embodiment.

The control command output unit 3 is configured to be capable of outputting, toward equipment connected by the submarine optical fiber cable C, a control signal CON being an optical signal. An output command of the control signal CON to the control command output unit 3 is given by, for example, a command signal SIG input from outside of the optical transmission device 400. The control command output unit 3 outputs the control signal CON and a selection signal SEL to the selection circuit 2 in response to the command signal SIG. For example, a UMS 1010 in FIG. 1 may monitor an optical communication system 1000, and provide the command signal SIG to the control command output unit 3 through an EMS according to a monitoring result.

The control signal CON may be an optical signal having a wavelength associated with a predetermined channel, or may be a signal superimposed on an optical signal by full-wave modulation of the optical signal such as amplitude modulation, for example.

The selection circuit 2 receives the control signal CON and the selection signal SEL from the control command output unit 3, and transfers the control signal CON to an optical fiber pair specified by the selection signal SEL. Thus, the control signal CON is transmitted to equipment to be controlled via the optical fiber pair specified by the control command output unit 3.

In this example, the control signal CON is transmitted through an optical fiber pair PA1 to various kinds of pieces of equipment such as an optical relay amplifier and an optical add-drop device of an optical communication system, but may be transmitted through other optical fiber pairs accommodated in the submarine optical fiber cable C. Since the submarine optical fiber cable C is directly or indirectly connected to various kinds of pieces of equipment, the control signal CON can be transmitted to the target equipment regardless of which optical fiber pair is used.

As described above, according to the present configuration, it is possible to transmit a control signal to various kinds of pieces of equipment such as an optical relay amplifier and an optical add-drop device of an optical communication system being directly or indirectly connected by the submarine optical fiber cable C, and control the equipment.

For example, when a control signal is supplied to an optical relay amplifier, it is possible to adjust an amplification factor of an optical signal in the optical relay amplifier. Further, for example, when a control signal is given to an optical add-drop device, changing a channel of an optical signal to be dropped by the optical add-drop device, and the like can be performed.

Note that, in the present example embodiment, the selection circuit 2 and the control command output unit 3 may be configured as a flat box type device, and the selection circuit 2 and the control command output unit 3 may be configured to be accommodated in a rack. In this case, by accommodating an interface unit, an optical multiplexing/demultiplexing unit, the selection circuit 2, and the control command output unit 3 in the rack, downsizing of the optical transmission device can be achieved and space saving can be achieved.

Fifth Example Embodiment

An optical transmission device according to a fifth example embodiment will be described. The optical transmission device according to the fifth example embodiment is a modification example of the optical transmission device according to the third example embodiment, and is configured to be capable of outputting monitoring dummy light for dark fiber monitoring for each of optical fiber pairs accommodated in a submarine optical fiber cable C.

Figure 9:
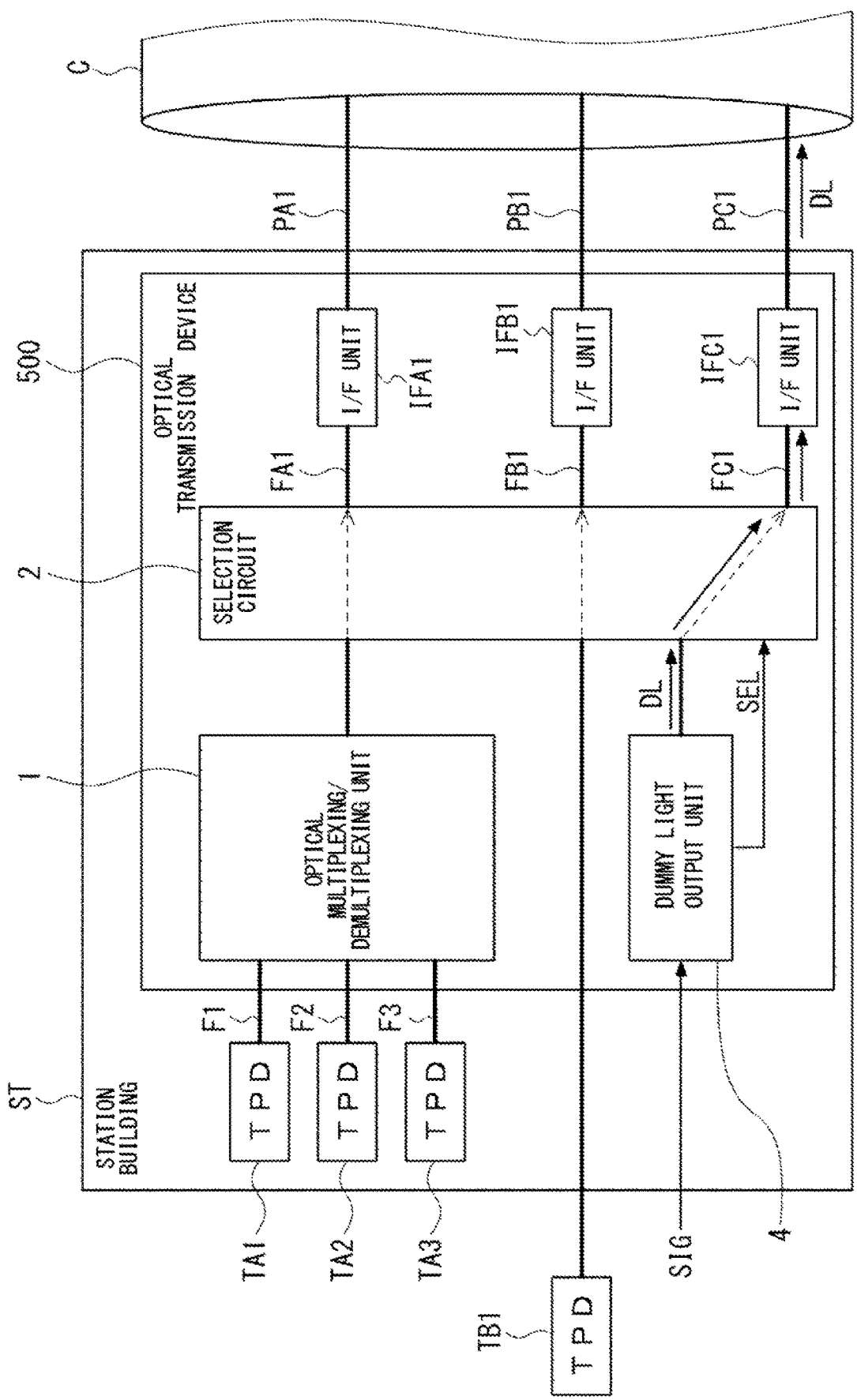
FIG. 9 is a diagram schematically illustrating a configuration of an optical transmission device according to a fifth example embodiment.

FIG. 9 schematically illustrates a configuration of an optical transmission device 500 according to the fifth example embodiment. The optical transmission device 500 has a configuration in which a selection circuit 2 and a dummy light output unit 4 are added to the optical transmission device according to the third example embodiment. In this example, since optical fiber pairs PA1 and PB1 are in-service fiber pairs, the dummy light output unit 4 outputs monitoring dummy light DL to an unused spare optical fiber pair PC1.

In a general optical transmission device which is not scheduled to add an transponder afterwards, a light source is connected to each fiber pair at a time of designing or constructing an optical communication system, and dark fiber monitoring is performed. Thereafter, adjustment of the transponder or the like is performed as an initial setting operation, based on a monitoring result, and thereby the optical communication system is constructed. In other words, it is not assumed that dark fiber monitoring is performed afterwards.

On the other hand, in this configuration, it is possible to connect a transponder to a spare interface unit after designing or starting an operation of the optical communication system. In this case, dark fiber monitoring in the general optical transmission device described above cannot be performed. Therefore, in this configuration, the dummy light output unit 4 is provided in order to enable dark fiber monitoring afterwards.

The dummy light output unit 4 is configured to be capable of outputting the monitoring dummy light DL. An output command of the monitoring dummy light DL to the dummy light output unit 4 is given by, for example, a command signal SIG being input from outside of the optical transmission device 500. For example, a UMS 1010 in FIG. 1 may provide the command signal SIG from an optical communication system 1000 to the control command output unit 3 through an EMS as necessary.

The dummy light output unit 4 outputs the monitoring dummy light DL and a selection signal SEL to the selection circuit 2 in response to the command signal SIG.

The selection circuit 2 receives the monitoring dummy light DL and the selection signal SEL from the dummy light output unit 4, and transfers the monitoring dummy light DL to the spare optical fiber pair PC1 specified by the selection signal SEL. Thus, the monitoring dummy light DL is output to the spare optical fiber pair PC1 being a dark fiber pair.

The monitoring dummy light DL is received and analyzed by a receiver connected to an optical transmission device in other station building. An analysis result may be transmitted to, for example, a user or the like who needs the analysis result, or may be transmitted to the UMS 1010.

As described above, according to the present configuration, it is possible to execute monitoring of a dark fiber as necessary. Thus, for example, by outputting the monitoring dummy light DL to the spare optical fiber pair PC1 and acquiring a transmission characteristic of the spare optical fiber pair PC1 in advance, it becomes possible to perform necessary adjustment or the like on a transponder connected to a spare interface unit IFC1.

Note that, in the present example embodiment, the selection circuit 2 and the dummy light output unit 4 may be configured as a flat box type device, and the selection circuit 2 and the dummy light output unit 4 may be configured to be accommodated in a rack. In this case, by accommodating an interface unit, an optical multiplexing/demultiplexing unit, the selection circuit 2, and the dummy light output unit 4 in the rack, downsizing of the optical transmission device can be achieved and space saving can be achieved.

Other Example Embodiments

Note that, it should be noted that the present invention is not limited to the above-mentioned example embodiments, and can be appropriately modified within a range not deviating from the gist. For example, a software defined network (SDN) controller may be used instead of a UMS 1010, and the SDN controller may be set on a cloud. The SDN controller can control a transmission path, a wavelength, and the like of an optical signal of a submarine optical communication system in response to a state of a network and an instruction from an operator. Further, the SDN controller virtually manages physical network topology and resources of the submarine optical communication system, and can achieve sharing of the system by a plurality of users and operators.

The control command output unit 3 according to the fourth example embodiment and the dummy light output unit 4 according to the fifth example embodiment described above need not be provided as alternatives. In other words, it is needless to say that an optical transmission device having both the control command output unit 3 and the dummy light output unit 4 may be configured.

A connection relationship between each interface unit and an optical fiber pair accommodated in a submarine optical fiber cable C described in the example embodiments described above is merely an example. For example, by providing a selection signal SEL to the selection circuit 2 described in the fourth and fifth example embodiments, the connection relationship between the interface unit and the optical fiber pair accommodated in the submarine optical fiber cable C may be changed as necessary. In this case, even when a certain interface unit fails, by switching the failed interface unit with a healthy spare interface unit, it is possible to achieve a redundant configuration that enables continuation of communication.

In the third to fifth example embodiments described above, although the optical transmission device has been described as having an optical multiplexing/demultiplexing unit, the optical transmission device may have a configuration without the optical multiplexing/demultiplexing unit as in the first example embodiment.

Although the optical transmission device according to the example embodiments described above has been described as being applied to an optical communication system using a submarine optical fiber cable, it may be applied to an optical communication system using an optical fiber cable laid on land.

Although the present invention has been described above, the present invention may also be described as follows.

(Supplementary Note 1) An optical transmission device including: a plurality of interface units configured to include first and second interface units being connected to mutually different first optical fiber transmission paths accommodated in an optical fiber cable; a second optical fiber transmission path configured to mediate an optical signal to be transmitted between the first interface unit and a first transponder installed inside a station building; and a third optical fiber transmission path configured to mediate an optical signal to be transmitted between the second interface unit and a second transponder installed outside the station building, in which the optical transmission device is installed inside the station building.

(Supplementary Note 2) The optical transmission device according to Supplementary Note 1, in which the plurality of interface units include a plurality of the first interface units associated with each of a plurality of the first transponders, and a plurality of the second interface units associated with each of a plurality of the second transponders.

(Supplementary Note 3) The optical transmission device according to Supplementary Note 1 or 2, further including a first optical multiplexing/demultiplexing unit configured to be connected to one of the first interface unit via one of the second optical fiber transmission path, and be connected to a plurality of the first transponders, in which the first optical multiplexing/demultiplexing unit multiplexes an optical signal being output from the plurality of connected first transponders, outputs the multiplexed optical signal to the one first interface unit via the one second optical fiber transmission path, demultiplexes an optical signal being input from the one first interface unit via the one second optical fiber transmission path, and outputs the demultiplexed optical signal to the plurality of connected first transponders.

(Supplementary Note 4) The optical transmission device according to any one of Supplementary Notes 1 to 3, further including a second optical multiplexing/demultiplexing unit configured to be connected to one of the second interface unit via one of the third optical fiber transmission path, and be connected to a plurality of the second transponders, in which the second optical multiplexing/demultiplexing unit multiplexes an optical signal being output from the plurality of connected second transponders, outputs the multiplexed optical signal to the one second interface unit via the one third optical fiber transmission path, demultiplexes an optical signal being input from the one second interface unit via the one third optical fiber transmission path, and outputs the demultiplexed optical signal to the plurality of connected second transponders.

(Supplementary Note 5) The optical transmission device according to any one of Supplementary Notes 1 to 4, in which the plurality of interface units include one or more third interface units being connected to mutually different first optical fiber transmission paths accommodated in the optical fiber cable, which are different from the first optical fiber transmission paths connected to the first and second interface units.

(Supplementary Note 6) The optical transmission device according to Supplementary Note 5, in which the third interface unit is configured to be connectable to the first or second transponder afterwards.

(Supplementary Note 7) The optical transmission device according to any one of Supplementary Notes 1 to 6, further including a selection circuit configured to be changeable in a connection relationship between the first and second transponders and the plurality of interface units.

(Supplementary Note 8) The optical transmission device according to Supplementary Note 7, in which the optical transmission device is connected to another optical equipment via the optical fiber cable, and the optical transmission device further includes a control command output unit configured to control the another optical equipment by outputting a control signal to the another optical equipment via any of the first to third interface units.

(Supplementary Note 9) The optical transmission device according to Supplementary Note 8, in which the control command output unit outputs, to the selection circuit, a signal specifying a connection relationship between the first and second transponders and the plurality of interface units.

(Supplementary Note 10) 10. The optical transmission device according to any one of Supplementary Notes 7 to 9, in which the optical transmission device is connected to another station building via the optical fiber cable, the optical transmission device further includes a dummy light output unit configured to output monitoring dummy light to any of the first optical fiber transmission paths via any of the first to third interface units, and a receiver provided in the another station building receives the monitoring dummy light, and analyzes a transmission characteristic of the first optical fiber transmission path through which the monitoring dummy light is transmitted.

(Supplementary Note 11) The optical transmission device according to Supplementary Note 10, in which the dummy light output unit outputs, to the selection circuit, a signal specifying a connection relationship between the first and second transponders and the plurality of interface units.

(Supplementary Note 12) An optical communication system including:
  an optical transmission device configured to be installed inside a station building; a first transponder configured to be installed inside the station building; and a second transponder configured to be installed outside the station building, in which the optical transmission device includes: a plurality of interface units including first and second interface units being connected to mutually different first optical fiber transmission paths accommodated in an optical fiber cable; a second optical fiber transmission path configured to mediate an optical signal to be transmitted between the first interface unit and the first transponder; and a third optical fiber transmission path configured to mediate an optical signal to be transmitted between the second interface unit and the second transponder.

(Supplementary Note 13) The optical communication system according to Supplementary Note 12, in which the plurality of interface units include a plurality of the first interface units associated with each of a plurality of the first transponders, and a plurality of the second interface units associated with each of a plurality of the second transponders.

(Supplementary Note 14) The optical communication system according to Supplementary Note 12 or 13, in which the optical transmission device further includes a first optical multiplexing/demultiplexing unit configured to be connected to one of the first interface unit via one of the second optical fiber transmission path, and be connected to a plurality of the first transponders, and the first optical multiplexing/demultiplexing unit multiplexes an optical signal being output from the plurality of connected first transponders, outputs the multiplexed optical signal to the one first interface unit via the one second optical fiber transmission path, demultiplexes an optical signal being input from the one first interface unit via the one second optical fiber transmission path, and outputs the demultiplexed optical signal to the plurality of connected first transponders.

(Supplementary Note 15) The optical communication system according to any one of Supplementary Notes 12 to 14, in which the optical transmission device further includes a second optical multiplexing/demultiplexing unit configured to be connected to one of the second interface unit via one of the third optical fiber transmission path, and be connected to a plurality of the second transponders, and the second optical multiplexing/demultiplexing unit multiplexes an optical signal being output from the plurality of connected second transponders, outputs the multiplexed optical signal to the one second interface unit via the one third optical fiber transmission path, demultiplexes an optical signal being input from the one second interface unit via the one third optical fiber transmission path, and outputs the demultiplexed optical signal to the plurality of connected second transponders.

(Supplementary Note 16) The optical communication system according to any one of Supplementary Notes 12 to 15, in which the plurality of interface units include one or more third interface units being connected to mutually different first optical fiber transmission paths accommodated in the optical fiber cable, which are different from the first optical fiber transmission paths connected to the first and second interface units.

(Supplementary Note 17) The optical communication system according to Supplementary Note 16, in which the third interface unit is configured to be connectable to the first or second transponder afterwards.

(Supplementary Note 18) The optical communication system according to any one of Supplementary Notes 12 to 17, in which the optical transmission device further includes a selection circuit configured to be changeable in a connection relationship between the first and second transponders and the plurality of interface units.

(Supplementary Note 19) The optical communication system according to Supplementary Note 18, in which the optical transmission device is connected to another optical equipment via the optical fiber cable, and the optical transmission device further includes a control command output unit configured to control the another optical equipment by outputting a control signal to the another optical equipment via any of the first to third interface units.

(Supplementary Note 20) The optical communication system according to Supplementary Note 19, in which the control command output unit outputs, to the selection circuit, a signal specifying a connection relationship between the first and second transponders and the plurality of interface units.

(Supplementary Note 21) The optical communication system according to any one of Supplementary Notes 18 to 20, in which the optical transmission device is connected to another station building via the optical fiber cable, the optical transmission device further includes a dummy light output unit configured to output a monitoring dummy light to any of the first optical fiber transmission paths via any of the first to third interface units, and a receiver provided in the another station building receives the monitoring dummy light, and analyzes a transmission characteristic of the first optical fiber transmission path through which the monitoring dummy light is transmitted.

(Supplementary Note 22) The optical communication system according to Supplementary Note 21, in which the dummy light output unit outputs, to the selection circuit, a signal specifying a connection relationship between the first and second transponders and the plurality of interface units.

Although the invention of the present application has been described above with reference to the example embodiments, the invention of the present application is not limited to the above. Various modifications can be made to the configuration and details of the invention of the present application which can be understood by a person skilled in the art within the scope of the invention.

This application is based upon and claims the benefit of priority from Japanese patent application No. 2019-186378, filed on Oct. 9, 2019, the disclosure of which is incorporated herein in its entirety by reference.

REFERENCE SIGNS LIST

1 Optical multiplexing/demultiplexing unit
2 Selection circuit

3 Control command output unit
4 Dummy light output unit
11 Multiplexer/demultiplexer
11A Multiplexer
11B Demultiplexer
12 Intensity compensation unit
100, 101, 200, 300, 400, 500 Optical transmission device
1000 Optical communication system
1001 Optical add-drop device
1010 UMS
1021 to 1023 EMS
AMP Optical relay amplifier
C Submarine optical fiber cable
C1 to C3 Optical fiber cable
CON Control signal
DL Monitoring dummy light
F1 to F3, FA1 to FA3, FB1 to FB3, PA1 to PA3, PB1 to PB3 Optical fiber pair
PC1 to PC3 Spare optical fiber pair
IFA1 Interface unit of in-station transponder
IFB1 Interface unit of out-of-station transponder
IFC1 Spare interface unit
SEL Selection signal
SIG Command signal
ST, ST1 to ST3 Station building
TA1 to TA3 In-station transponder
TB1 to TB3 Out-of-station transponder

What is claimed is:

1. An optical transmission device installable inside a station building and connectable to another station building via an optical fiber cable, the optical transmission device comprising:
   a plurality of interface units including first, second, and third interface units configured to respectively connect to mutually different first optical fiber transmission paths accommodated in the optical fiber cable;
   a second optical fiber transmission path configured to mediate an optical signal to be transmitted between the first interface unit and a first transponder installed inside the station building;
   a third optical fiber transmission path configured to mediate an optical signal to be transmitted between the second interface unit and a second transponder installed outside the station building;
   a dummy light output unit configured to output monitoring dummy light and a selection signal specifying a first optical fiber transmission path of the plurality of first optical fiber transmission paths to which monitoring dummy light is to be transmitted via a corresponding interface unit of the plurality of interface units; and
   a selection circuit switchably connected between the dummy light output unit and the plurality of interface units, the selection circuit configured to receive the selection signal from the dummy light output unit and in response transfer the monitoring dummy light from the dummy light output unit to the first optical transmission path specified in the selection signal via the corresponding interface unit, wherein
   a receiver provided in the another station building receives the monitoring dummy light and analyzes a transmission characteristic of the first optical fiber transmission path specified in the selection signal and through which the monitoring dummy light is transmitted.

2. The optical transmission device according to claim 1, wherein the first interface unit is one of a plurality of first interface units, the first transponder is one of a plurality of first transponders, each of the plurality of first interface units is associated with a respective first transponder of the plurality of first transponders, the second interface unit is one of a plurality of second interface units, the second transponder is one of a plurality of second transponders, and each of the plurality of second interface units is associated with a respective second transponder of the plurality of second transponders.

3. The optical transmission device according to claim 1, wherein the first transponder is one of a plurality of first transponders, the second optical fiber transmission path is one of a plurality of second optical fiber transmission paths respectively connected to the plurality of first transponders, the optical transmission device further comprises a first optical multiplexing/demultiplexing unit configured to switchably connect the first interface unit via one of the plurality of second optical fiber transmission paths to a respective one of the plurality of first transponders,
   wherein the first optical multiplexing/demultiplexing unit multiplexes optical signals output from the plurality of first transponders to generate a multiplex optical signal, outputs the multiplexed optical signal to the first interface unit via the one of the plurality of second optical fiber transmission paths, demultiplexes an optical signal input from the first interface unit, and outputs the demultiplexed optical signal to the plurality of first transponders.

4. The optical transmission device according to claim 1, wherein the third interface unit is one of a plurality of third interface units.

5. An optical communication system comprising:
   an optical transmission device configured to be installed inside a station building and to be connected to another station building via an optical fiber cable;
   a first transponder configured to be installed inside the station building; and
   a second transponder configured to be installed outside the station building,
   wherein the optical transmission device includes:
   a plurality of interface units including first, second, and third interface units configured to respectively connect to mutually different first optical fiber transmission paths accommodated in the optical fiber cable;
   a second optical fiber transmission path configured to mediate an optical signal to be transmitted between the first interface unit and a first transponder installed inside the station building;
   a third optical fiber transmission path configured to mediate an optical signal to be transmitted between the second interface unit and a second transponder installed outside the station building;
   a dummy light output unit configured to output monitoring dummy light and a selection signal specifying a first optical fiber transmission path of the plurality of first optical fiber transmission paths to which monitoring dummy light is to be transmitted via a corresponding interface unit of the plurality of interface units; and
   a selection circuit switchably connected between the dummy light output unit and the plurality of interface units, the selection circuit configured to receive the selection signal from the dummy light output unit and in response transfer the monitoring dummy light from the dummy light output unit to the first optical transmission path specified in the selection signal via the corresponding interface unit, wherein
   a receiver provided in the another station building receives the monitoring dummy light and analyzes a transmission characteristic of the first optical fiber transmission path specified in the selection signal and through which the monitoring dummy light is transmitted.

6. The optical communication system according to claim 5, wherein the first interface unit is one of a plurality of first interface units, the first transponder is one of a plurality of first transponders, each of the plurality of first interface units is associated with a respective first transponder of the plurality of first transponders, the second interface unit is one of a plurality of second interface units, the second transponder is one of a plurality of second transponders, and each of the plurality of second interface units is associated with a respective second transponder of the plurality of second transponders.

7. The optical communication system according to claim 5, wherein the first transponder is one of a plurality of first transponders, the second optical fiber transmission path is one of a plurality of second optical fiber transmission paths respectively connected to the plurality of first transponders, the optical transmission device further comprises a first optical multiplexing/demultiplexing unit configured to switchably connect the first interface unit via one of the plurality of second optical fiber transmission paths to a respective one of the plurality of first transponders, wherein the first optical multiplexing/demultiplexing unit multiplexes optical signals output from the plurality of first transponders to generate a multiplex optical signal, outputs the multiplexed optical signal to the first interface unit via the one of the plurality of second optical fiber transmission paths, demultiplexes an optical signal input from the first interface unit, and outputs the demultiplexed optical signal to the plurality of first transponders.

8. The optical communication system according to claim 5, wherein the third interface unit is one of a plurality of third interface units.

* * * * *